Jan. 8, 1929. 1,698,534

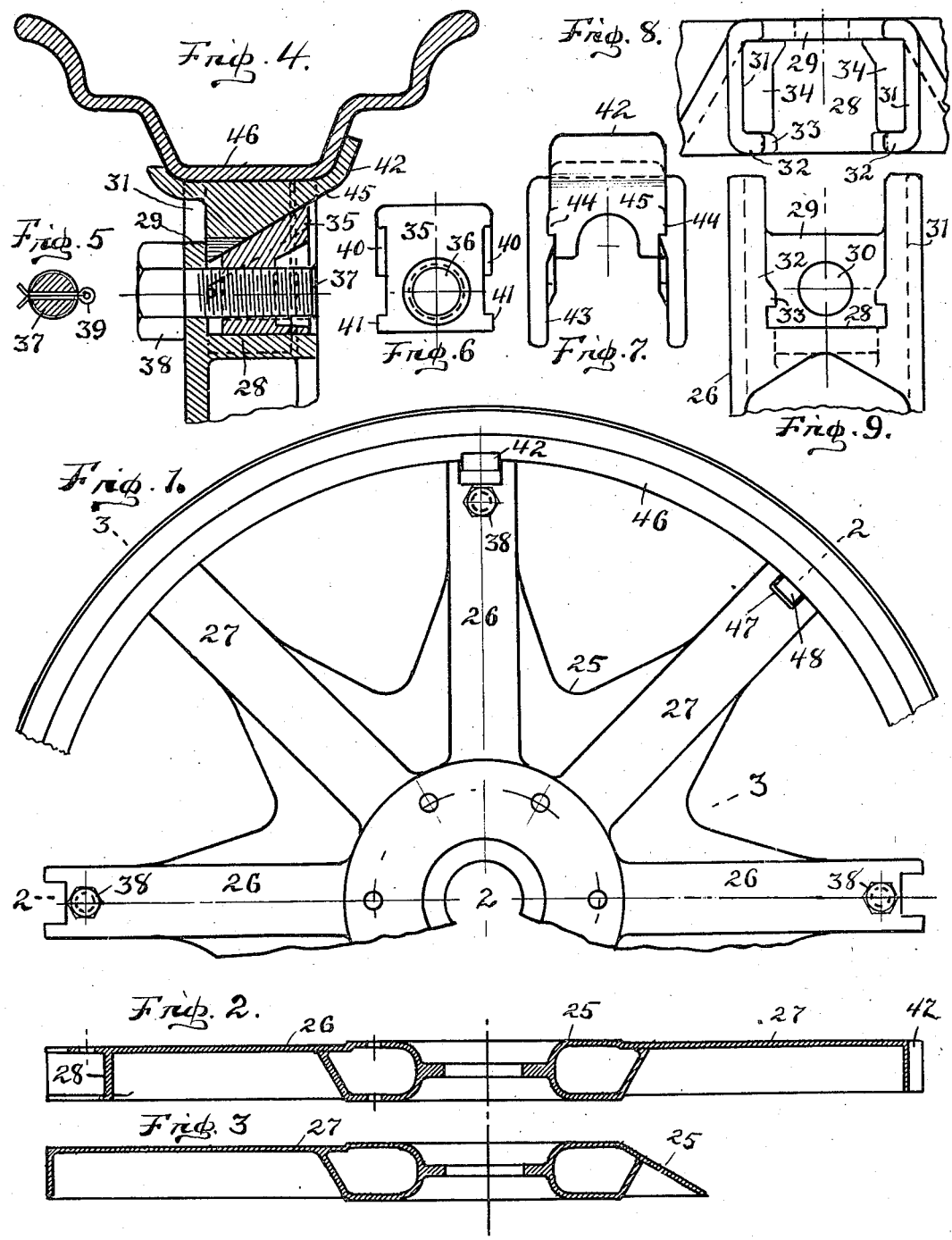

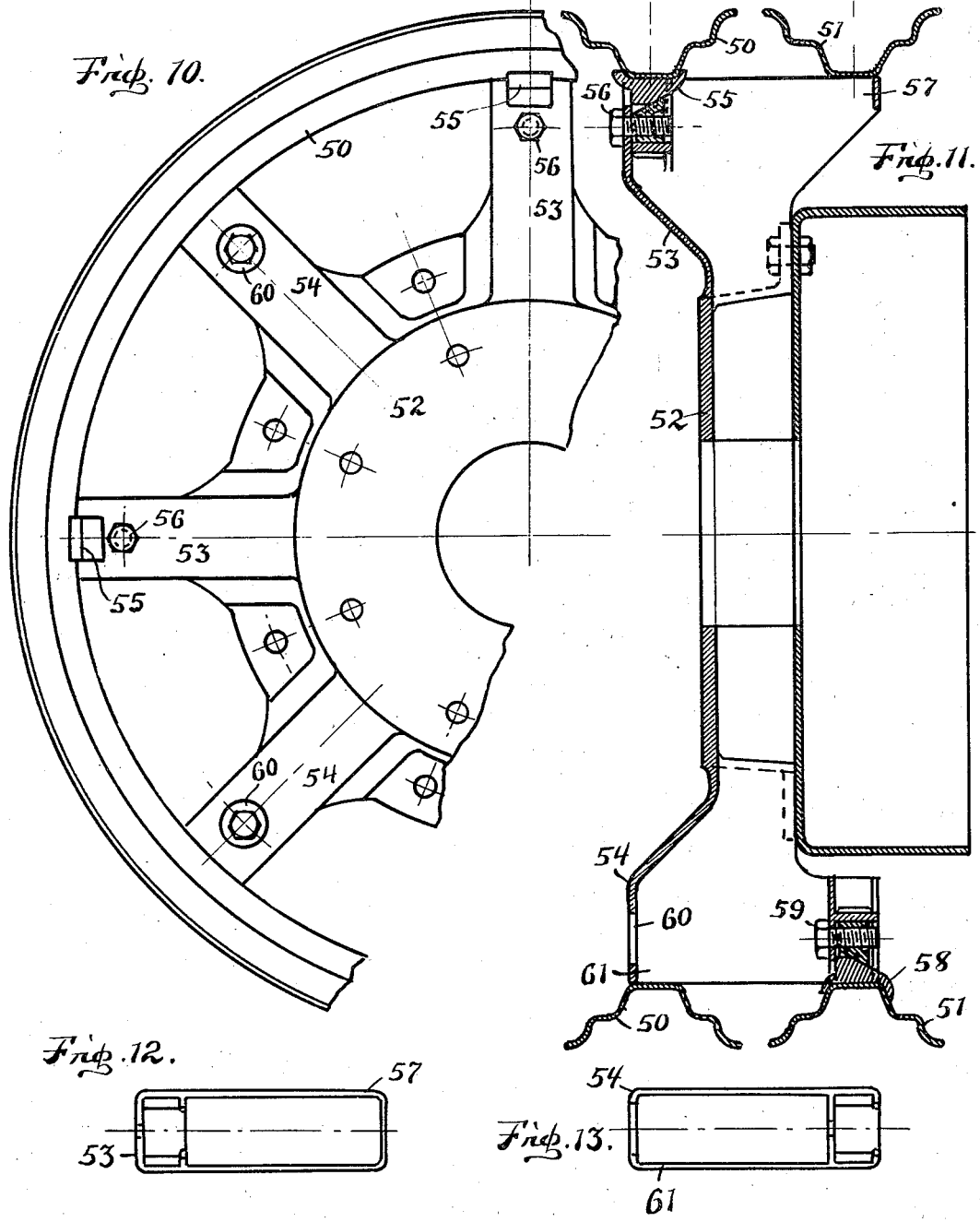

J. E. BROXON

TRUCK WHEEL

Filed May 5, 1926 4 Sheets-Sheet 3

INVENTOR.

BY James E. Broxon

W. G. Burns ATTORNEY.

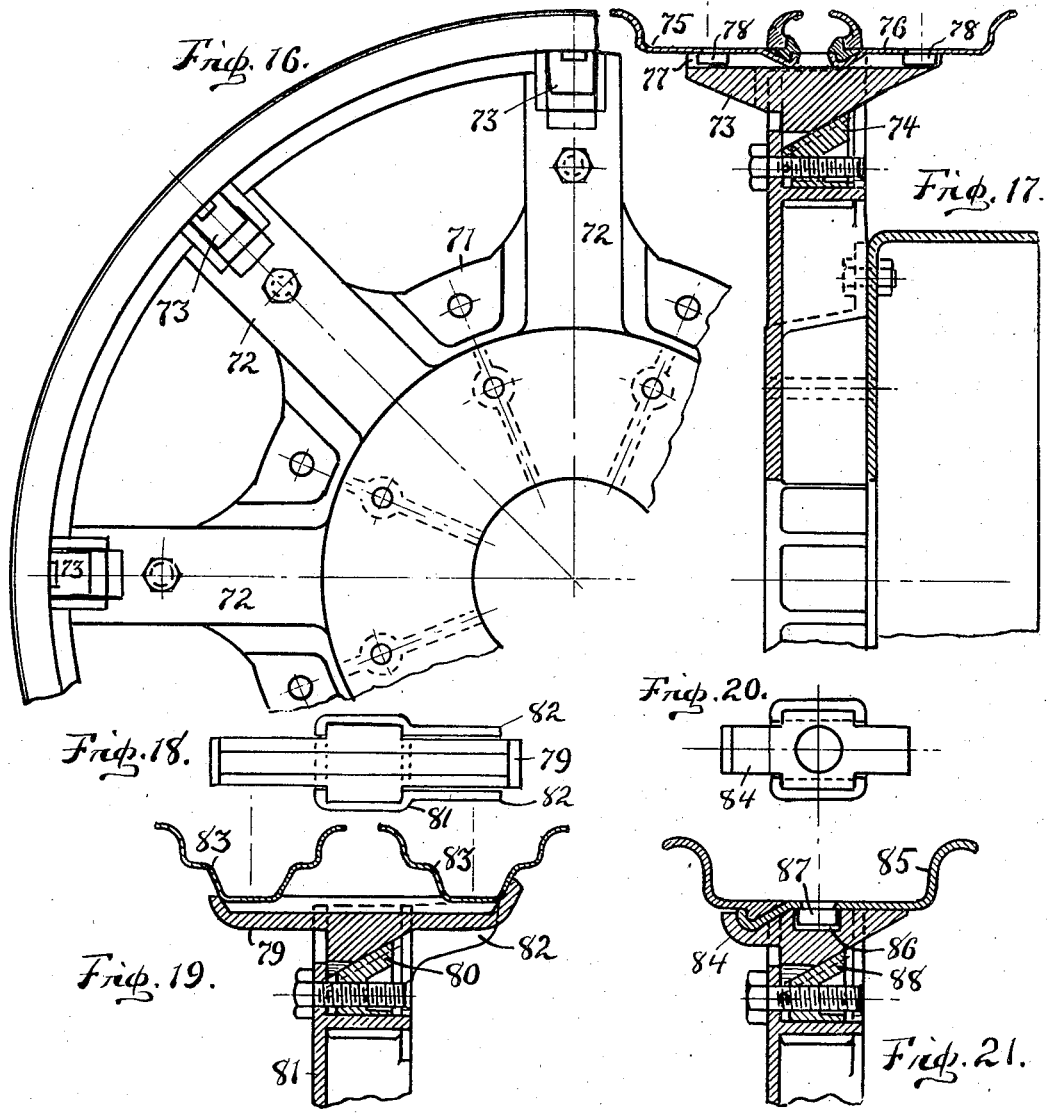

Patented Jan. 8, 1929.

1,698,534

UNITED STATES PATENT OFFICE.

JAMES E. BROXON, OF AKRON, OHIO.

TRUCK WHEEL.

Application filed May 5, 1926. Serial No. 106,833.

This invention relates to improvements in truck wheels of that type having demountable tire rims in supported relation with a wheel spider, and the invention pertains particularly to the means by which the tire rims are applied to and tightened in place upon the spider. The objects of the improvement are: to provide an expedient in connection with the arms of a wheel spider for tightening the tire rim in place thereon, and which will not necessarily become detached from the spider arms when the tire rim is removed; and to so arrange the tightening means in connection with the spider arms as to facilitate the mounting of a pair of tire rims upon a single wheel spider.

These objects are accomplished by the construction illustrated in the accompanying drawings, in which:—

Fig. 1 is a fragmentary end elevation of a wheel structure employing the invention;

Fig. 2 is a section of Fig. 1 on the line 2—2—2—;

Fig. 3 is a section of Fig. 1 on the line 3—2—3— thereof;

Fig. 4 is a fragmentary view showing a section through the tire rim, the adjustable jaw mechanism and the corresponding arm in which said mechanism is mounted;

Fig. 5 is a cross section through the shank of the screw shown in Fig. 4;

Fig. 6 is a rear end view of the adjustable wedge, projected from Fig. 4;

Fig. 7 is a similar view of the adjustable jaw projected from Fig. 4;

Fig. 8 is a plan view of the arm in which said wedge and jaw are mounted;

Fig. 9 is a rear end elevation of the arm in which the wedge and jaw are mounted, the view being projected from Figs. 4 and 8;

Fig. 10 is a fragmentary end elevation of a wheel structure embodying the invention in modified form arranged for dual rims;

Fig. 11 is a cross section projected from Fig. 10;

Fig. 12 is a plan view of one of the arms of the structure shown in Fig. 10, arranged to receive adjustable jaw mechanism for the front rim;

Fig. 13 is a similar view of another arm arranged to receive adjustable jaw mechanism for the rear rim;

Fig. 16 is a fragmentary section of a wheel structure embodying the invention in modified form;

Fig. 17 is a section projected from Fig. 16;

Figs. 18 and 19 show respectively a plan and section of a modified arm and adjustable jaw applicable to the wheel spider shown in Fig. 16 and for dual rims of a different type from that shown in Fig. 17; and Figs. 20 and 21 are similar views showing the arm and adjustable jaw modified for the accommodation of a single rim.

The characters appearing in the description refer to parts shown in the drawings and designated thereon by corresponding characters.

Figures 14, 15:
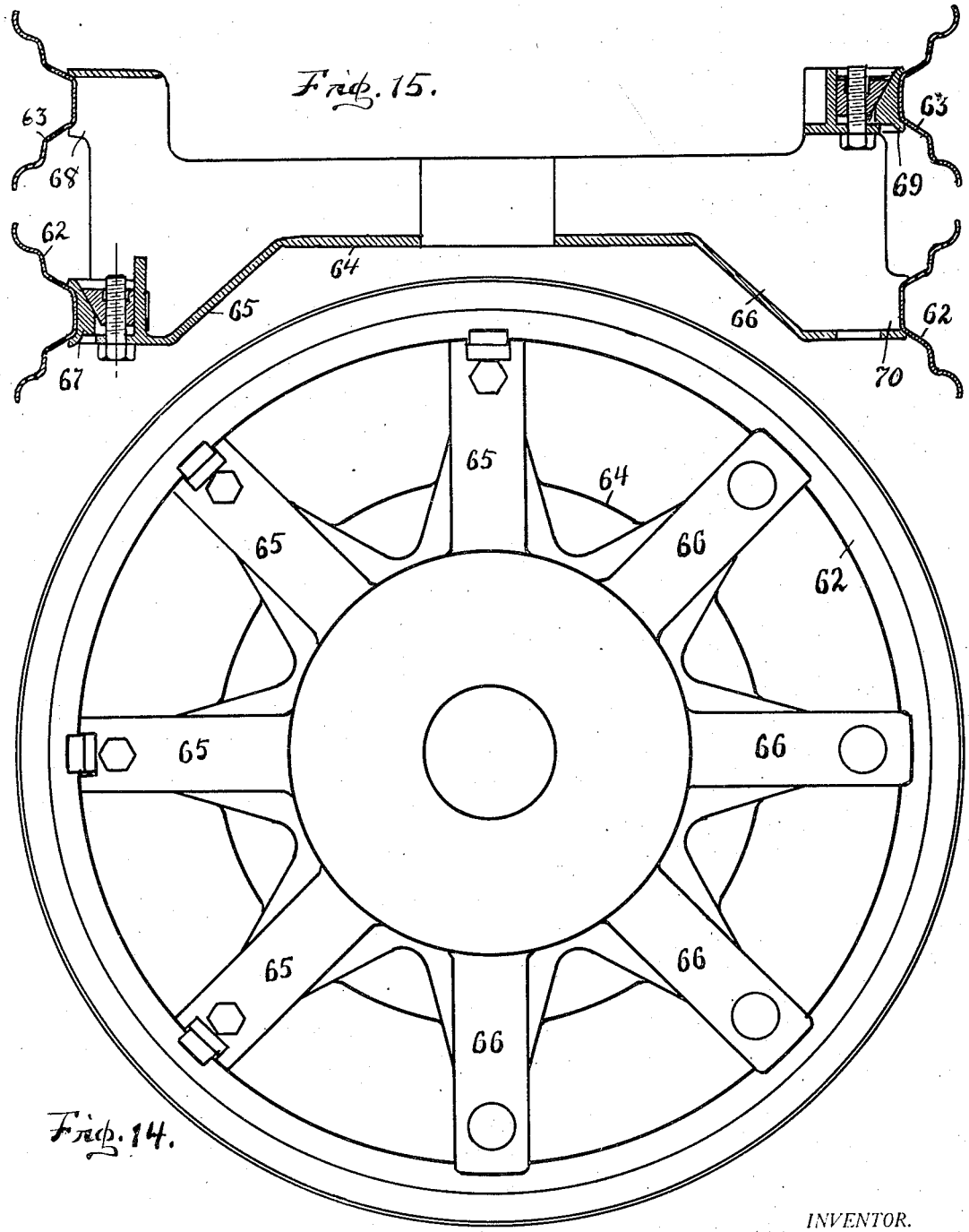
Fig. 14 is an end elevation of a wheel structure in which the invention is embodied in modified form.
Fig. 15 is a section projected from Fig. 14.

The invention in the form illustrated in Figs. 1 to 9 inclusive, consists of a spider 25 having radial arms 26 and 27 alternately disposed. The outer end of each of the arms 26 has therein an internal integral seat 28 transversely disposed. The front wall of said arm has an extending portion 29 that projects beyond the seat and is provided with a bolt hole 30 therein, and each side wall 31 of said arm extends beyond the outer end of the front wall 29 while the back of that portion of the arm beyond the seat 28 and the outer end of the arm are open. Oppositely disposed flanges 32 extend respectively from the side walls 31, and corresponding oppositely disposed shoulders 33 extend from said flanges respectively at points thereon spaced from the seat 28. Also, between each side wall 31 and the seat 28 is an opening 34.

A wedge block 35 having a threaded opening 36 extending therethrough is slidably mounted upon the seat 28 in each arm 26 and is actuated by a screw 37 that extends through the bolt hole 30 in the front wall of the arm, the screw head 38 being held against the outer face of said front wall by a cotter pin 39 that extends through the shank of the screw and engages the inner face of said front wall so as to prevent withdrawal of said screw. As the screw is turned, the wedge is moved backward or forward accordingly on said seat. On each side of the wedge extending along the upper edge thereof is a shoulder 40 which is inclined from the front to the back in conformity with the slanting outer face of the wedge. Also, on each side of the wedge along the bottom thereof is a shoulder 41 that extends parallel with the bottom of the wedge.

An adjustable jaw 42 is mounted in each arm 26 in operative connection with the corresponding wedge 35. The jaw has parallel legs 43 spaced apart, each of which has in its inner face a groove 44 that extends upon an incline from the front to the back of the leg and adjacent the underface 45 of the jaw which is also inclined, the jaw is seated upon the corresponding wedge 35 with its shoulders 40 fitting in the corresponding grooves 44 in said legs, and said legs extend respectively through the corresponding openings 34 in the arm and have longitudinal guided movement between the side walls of said arm accordingly as the wedge 35 is adjusted on the seat 28. The shoulders 41 on the wedge 35 extend beneath the shoulders 33 on the arm 26 so that the wedge is confined to its seat. By this arrangement the wedge and jaw have interlocking relation with the arm in which they are mounted and may be actuated within their range of adjustment without becoming dissembled. The inner end of the screw 37 may be slightly upset so as to limit inward movement of the wedge and thereby prevent its removal.

The outer end of the wedge 42 is shaped to receive the inner perimeter of a tire rim 46, which in Figs. 1 and 4 is shown to be of the "drop-center" type, and one of the arms 27 is provided with a recess 47 in its outer end to receive a lug 48 that projects from the inner perimeter of the rim so that "creeping" of the rim on the spider structure is thereby obviated.

In the operation of the invention, the wedge 35 in each of the arms 26 is adjusted to its rearmost position by manipulating the screw 37 so that the jaw 42 will be drawn to its innermost position. The tire 46 is then centered upon the spider arms 27 and alined with the jaws, so that when the jaws are moved outwardly by readjusting the wedges, the rim will be tightened upon the spider structure.

In the modifications shown in Figs. 10 and 11 the invention is arranged for use of dual demountable rims 50 and 51. In this instance the spider 52 is provided with arms 53 and 54 that are alternately disposed. Each arm 53 has an adjustable jaw mechanism 55 in its front portion operated by an adjusting screw 56, the head of which is exposed on the exterior front of said arm. The construction of the adjustable jaw mechanism and its operation is the same as that in the previous instance. Each arm 53 has also a rearwardly extending portion at its outer end forming a fixed rest 57 for the inner rim 51. Each of the arms 54 has in its rear part an adjustable jaw mechanism 58 operated by a screw 59, the head of which screw is made accessible by providing an opening 60 in the front wall of said arm. Each arm 54 has also a forwardly extending portion at its outer end forming a fixed rest 61 for the outer rim 50. The adjustable jaw mechanism 58 in the rear of the arms 54 are disposed in alinement with the fixed rests 57 on the arms 53, while the adjustable jaw mechanism 55 in the arms 53 are disposed in alinement with the fixed rests 61 in front of the arms 54. In this instance the innermost rim 51 is first centered upon the fixed rests 57, and the adjustable jaw mechanism in each of the alternate arms 54 is adjusted so as to bear outwardly against the inner perimeter of the rim, thus tighten it in place upon the wheel structure. The outermost rim 50 is then centered upon the fixed rests 61, and the adjustable jaw mechanism 55 in each of the arms 53 is adjusted so as to bear outwardly against the inner perimeter of the rim and thus tighten it in position upon the wheel structure.

The modification shown in Figs. 14 and 15 provides also for use of dual demountable rims 62 and 63. In this instance the spider 64 has arms 65 and 66 arranged in opposite groups so that the group of arms 65 are disposed upon the side of the axis of the spider opposite the group of arms 66. Each arm 65 has arranged in its outer end in the front portion thereof an adjustable jaw mechanism 67, and at the back thereof a fixed rest 68, which rest is recessed in its outer end to receive the inner perimeter of the rim 63. Each of the arms 66 has arranged in its rear portion at its outer end an adjustable jaw mechanism 69, and at its front portion a fixed rest 70, which rest is recessed in its outer end to receive the inner perimeter of the rim 62. When the rims are mounted upon the wheel structure the rim 63 is seated upon the rest 68 of the group of arms 65 and is tightened by the jaw mechanism 69 in the opposite group of arms 66; and the rim 62 is seated upon the rests 70 of the group of arms 66 and is tightened by the jaw mechanism 67 in the opposite group of arms 65. By this arrangement when the rims are applied first into the recessed rests in one group of arms, the opposite part of the rim will be sufficiently distant from the axis of the spider as to pass over the outer end of the jaw mechanism in each of the opposite group of arms, when said mechanism is adjusted to the innermost position, and when the jaw mechanism is tightened outwardly against the rim, the other portion of the rim will be held tightly in the recessed seats on the opposite group of arms.

In the modification shown in Figs. 16 and 17, the spider 71 has arranged in the outer end of each of its arms 72 and adjustable jaw 73 having actuated relation with a corresponding wedge 74 which is disposed in the arm in the same manner as in the former instances. The jaw 73 is shaped at its outer end so as to form seats for dual rims 75 and 76 and has a recess 77 made therein for the reception of a lug 78 that projects from the inner perimeter of each of said rims. In this form the jaws constitute a common support for both of the rims 75 and 76.

In the modification shown in Figs. 18 and 19 the adjustable jaw 79 has actuated relation with a wedge 80 disposed in the arm 81 as in the former instances. The arm 81 has at its outer end a pair of rearwardly extending brackets 82 upon which one of the dual rims 83 is positioned preliminary to the final adjustment of the jaw 79. By constructing the wheel spider with each arm provided with said brackets 82, one of the rims is initially centered upon the spider when placed on said brackets. The jaw 79 in this instance is recessed in its outer end so as to form a seat for each of the dual rims 83, which rims are tightened in place upon the wheel structure when the jaws are moved outwardly against the inner perimeters of the rims.

The structure shown in Figs. 20 and 21 includes an adjustable jaw 84 formed to support a single rim 85, and is provided with a socket 86 in its outer end for the reception of a lug 87 that projects from the inner perimeter of the rim, by means of which creeping of the rim on the wheel structure is obviated. In this instance, as in the former instances the adjustable jaw has actuated relation with a wedge 88.

What I claim is:—

1. A wall structure comprising a spider having radially disposed arms, each alternate arm having at its outer end a forwardly extending fixed rest and at a point opposite thereto vertically extending guides, and each intervening spoke having at its outer end a rearwardly extending fixed rest and at a point opposite thereto vertically extending guides; a vertically adjustable jaw mechanism in each spoke movable in said guides; and a pair of tire rims in parallel relation with each other disposed, one upon the inwardly extending rests and corresponding jaws and the other upon the forwardly extending rests and corresponding jaws.

2. A wheel consisting of a spider some of the arms of which have fixed rests at their outer ends adjacent the front thereof, and the other arms of said spider having fixed rests at their outer ends adjacent the backs thereof, a radially adjustable jaw mechanism in the outer end of each arm disposed opposite the fixed rest thereof; and a pair of tire rims, one of which is disposed upon the innermost rest and jaws, and the other upon the outermost rest and jaws.

In testimony whereof I affix my signature.

JAMES E. BROXON.